United States Patent
Leone et al.

(10) Patent No.: US 9,016,244 B2
(45) Date of Patent: Apr. 28, 2015

(54) ENGINE CONTROL FOR CATALYST REGENERATION

(71) Applicant: Ford Global Technologies, LLC, Dearborn, MI (US)

(72) Inventors: Thomas G. Leone, Ypsilanti, MI (US); Joseph Norman Ulrey, Dearborn, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 13/868,742

(22) Filed: Apr. 23, 2013

(65) Prior Publication Data

US 2014/0311443 A1  Oct. 23, 2014

(51) Int. Cl.
*F02B 47/02* (2006.01)
*F02M 25/00* (2006.01)
*F01N 3/10* (2006.01)
*F01N 3/04* (2006.01)
*F01N 3/20* (2006.01)
(Continued)

(52) U.S. Cl.
CPC . *F02B 47/02* (2013.01); *F01N 3/04* (2013.01); *F01N 3/2066* (2013.01); *F01N 9/00* (2013.01); *F01N 2430/02* (2013.01); *F01N 2610/00* (2013.01); *F01N 2900/08* (2013.01); *F02D 2200/08* (2013.01); *F02D 41/0087* (2013.01); *F02D 41/0235* (2013.01); *F02D 41/065* (2013.01); *F02N 11/0814* (2013.01); *F02D 41/0025* (2013.01); *F02D 2200/021* (2013.01); *F02D 2200/0406* (2013.01); *F02D 2200/101* (2013.01); *Y02T 10/47* (2013.01); *Y02T 10/24* (2013.01)

(58) Field of Classification Search
USPC .......... 60/286, 295, 299, 301, 302; 123/25 R, 123/25 A, 25 C, 25 E, 25 F, 25 J, 198 F
See application file for complete search history.

(56) References Cited

U.S. PATENT DOCUMENTS 5,875,743 A * 3/1999 Dickey ......................... 123/25 C
6,941,901 B2 * 9/2005 Taxon .......................... 123/25 E
(Continued)

FOREIGN PATENT DOCUMENTS

WO  2009080152 A1  7/2009

OTHER PUBLICATIONS

Theis, Joseph R., et al., "Nox Control During Engine Idle-Stop Operations," U.S. Appl. No. 13/656,454, filed Aug. 2, 2012, 62 pages.
(Continued)

*Primary Examiner* — Marguerite McMahon
*Assistant Examiner* — Tea Holbrook
(74) *Attorney, Agent, or Firm* — Julia Voutyras; Alleman Hall McCoy Russell & Tuttle LLP

(57) ABSTRACT

Methods and systems are provided for injecting water during an engine cylinder deactivation event so as to reduce an exhaust catalyst regeneration requirement following the cylinder deactivation. In one example, water is injected at one or more deactivated engine cylinders to reduce oxidation of the exhaust catalyst. Then, during engine cylinder reactivation, a degree of richness of a combustion air-to-fuel ratio may be reduced to decrease fuel penalty to the engine while reducing NOx emission.

20 Claims, 7 Drawing Sheets

(51) Int. Cl.
*F01N 9/00* (2006.01)
*F02D 41/00* (2006.01)
*F02D 41/02* (2006.01)
*F02D 41/06* (2006.01)
*F02N 11/08* (2006.01)

(56) References Cited

U.S. PATENT DOCUMENTS

| | | | |
|---|---|---|---|
| 6,969,492 B1 | 11/2005 | Goerigk et al. | |
| 7,004,115 B2 * | 2/2006 | Patton | 123/25 C |
| 7,793,493 B1 * | 9/2010 | Mcilroy | 60/315 |
| 7,877,189 B2 * | 1/2011 | Leone | 701/103 |
| 7,997,065 B2 | 8/2011 | Yacoub | |
| 8,341,940 B2 * | 1/2013 | Ichikawa et al. | 60/286 |
| 8,627,655 B2 * | 1/2014 | Kopp | 60/311 |
| 2002/0043222 A1 * | 4/2002 | Singh | 123/25 C |
| 2004/0139934 A1 * | 7/2004 | Patton | 123/70 R |
| 2004/0221821 A1 * | 11/2004 | Taxon | 123/25 A |
| 2007/0119415 A1 * | 5/2007 | Lewis et al. | 123/295 |
| 2007/0151528 A1 * | 7/2007 | Hedman | 123/25 D |
| 2007/0215107 A1 * | 9/2007 | Shelby et al. | 123/406.26 |
| 2007/0215111 A1 * | 9/2007 | Surnilla | 123/431 |
| 2007/0277775 A1 * | 12/2007 | Orlosky | 123/25 |
| 2008/0288158 A1 * | 11/2008 | Leone | 701/103 |
| 2009/0282807 A1 * | 11/2009 | Rioli et al. | 60/276 |
| 2010/0005873 A1 * | 1/2010 | Katoh et al. | 73/114.75 |
| 2010/0101529 A1 * | 4/2010 | Lewis et al. | 123/299 |
| 2010/0147263 A1 * | 6/2010 | Russell et al. | 123/310 |
| 2010/0294235 A1 * | 11/2010 | Lewis et al. | 123/299 |
| 2011/0052454 A1 * | 3/2011 | Kato | 422/171 |
| 2011/0061374 A1 * | 3/2011 | Noritake | 60/286 |
| 2011/0100314 A1 * | 5/2011 | Storhok et al. | 123/179.16 |
| 2012/0191288 A1 | 7/2012 | Qi et al. | |
| 2013/0146020 A1 * | 6/2013 | Choi | 123/25 A |
| 2013/0311065 A1 * | 11/2013 | Sun et al. | 701/104 |
| 2013/0318949 A1 * | 12/2013 | Matsunaga et al. | 60/286 |
| 2014/0039778 A1 * | 2/2014 | Kerns et al. | 701/103 |
| 2014/0121951 A1 * | 5/2014 | Bidner et al. | 701/112 |

OTHER PUBLICATIONS

Theis, Joseph R., et al., "Nox Control During Cylinder Deactivation," U.S. Appl. No. 13/565,490, filed Aug. 2, 2012, 62 pages.

* cited by examiner

ENGINE CONTROL FOR CATALYST REGENERATION

BACKGROUND/SUMMARY

Engine emission control systems may include one or more exhaust catalysts to address the various exhaust components. These may include, for example, three-way catalysts, NOx storage catalysts, light-off catalysts, SCR catalysts, etc. Engine exhaust catalysts may require periodic regeneration to restore catalytic activity and reduce catalyst oxidation. For example, catalysts may be regenerated by injecting sufficient fuel to produce a rich environment and reduce the amount of oxygen stored at the catalyst. As such, fuel consumed during catalyst regeneration can degrade engine fuel economy. Accordingly, various catalyst regeneration strategies have been developed.

One example approach is shown by Georigk et al. in U.S. Pat. No. 6,969,492. Therein, an emission control device includes catalytic converter stages generated by at least two catalysts arranged in series. Specifically, the catalytic stages include a three-way catalyst arranged in series with (e.g., upstream of) a NOx reduction catalyst. The different ammonia storage performance of the different catalysts enables NOx reduction to be improved and reduces the need for catalyst regeneration. Another example approach is shown by Eckhoff et al. in WO 2009/080152. Therein, an engine exhaust system includes multiple NOx storage catalysts with an intermediate SCR catalyst, and an exhaust air-to-fuel ratio is continually alternated between rich and lean phases based on differences between an air-to-fuel ratio upstream of a first NOx storage catalyst and an air-to-fuel ratio downstream of a second NOx storage catalyst.

However, the inventors herein have identified potential issues with such approaches. For example, the inventors have recognized that the regeneration control may degrade during the idle-stop operations performed during a vehicle drive cycle. In particular, during an idle-stop when the engine is deactivated and fuel is shut off for the shut-down, the engine still spins a few more times. This spinning pumps air over an exhaust three-way catalyst, causing the catalyst to become oxidized and degrading its ability to reduce NOx when the engine is reactivated. Likewise, before the engine is restarted from idle-stop, the engine is spun a few times, providing another opportunity during which air can be pumped over the exhaust catalyst. And while enrichment can be used to quickly regenerate the three-way catalyst upon engine reactivation, the enrichment leads to a fuel penalty. In addition, delays in engine restart can degrade engine performance.

In one example, some of the above issues may be at least partly addressed by a method for reducing exhaust catalyst oxidation during a cylinder deactivation, thereby reducing an amount of regeneration required upon reactivating the engine cylinders. Specifically, the method may include selectively deactivating one or more engine cylinders via deactivatable fuel injectors. Then, during cylinder deactivation, water may be injected at the one or more deactivated engine cylinders to reduce oxidation of a first exhaust catalyst. In one example, the first exhaust catalyst may be a three-way catalyst. An engine controller may determine an injection timing and injection amount for the water injection during the cylinder deactivation. Upon engine cylinder reactivation (e.g., after an idle-stop), water injection may be stopped and the one or more deactivated engine cylinders may be reactivated with a combustion air-to-fuel ratio based on an estimated ammonia content of a second exhaust catalyst. In one example, the second exhaust catalyst may be an SCR catalyst. For example, the combustion air-to-fuel ratio may be less rich as the ammonia content of the second exhaust catalyst increases. In this way, by injecting water and reducing catalyst oxidation during a cylinder deactivation event, fuel penalty from enrichment during cylinder reactivation may be reduced while maintain a required NOx emission level.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for injecting water during an engine cylinder deactivation event so as to reduce an exhaust catalyst regeneration requirement following the cylinder deactivation. The cylinder deactivation event (or lean operation) may include an idle-stop operation, such as in the engine system of FIGS. 1 and 3, or cylinder deactivation in a variable displacement engine, such as in the engine system of FIGS. 2A-B and 3. Still other cylinder deactivation events may include a deceleration fuel shut-off operation (DFSO). An engine controller may be configured to perform a control routine, such as the example routine of FIG. 4, for injecting water and adjusting exhaust catalyst regeneration based on engine cylinder deactivation. Specifically, water may be injected at one or more deactivated engine cylinders during the cylinder deactivation event. A method for determining the amount of water injection, as well as the timing of the water injection, is presented at FIG. 5. Upon reactivation of the engine cylinders, the engine controller may adjust a combustion air-to-fuel ratio of the reactivated cylinders. Example adjustments to water injection and air-to-fuel ratio in response to cylinder deactivation are shown at FIG. 6. A degree of richness (e.g., amount of rich bias) of the combustion air-to-fuel ratio may be based on an amount of ammonia stored in an exhaust catalyst, such as an SCR catalyst. In this way, an exhaust catalyst, such as a three-way catalyst may be regenerated while reducing the fuel penalty to the engine.

Figure 1:
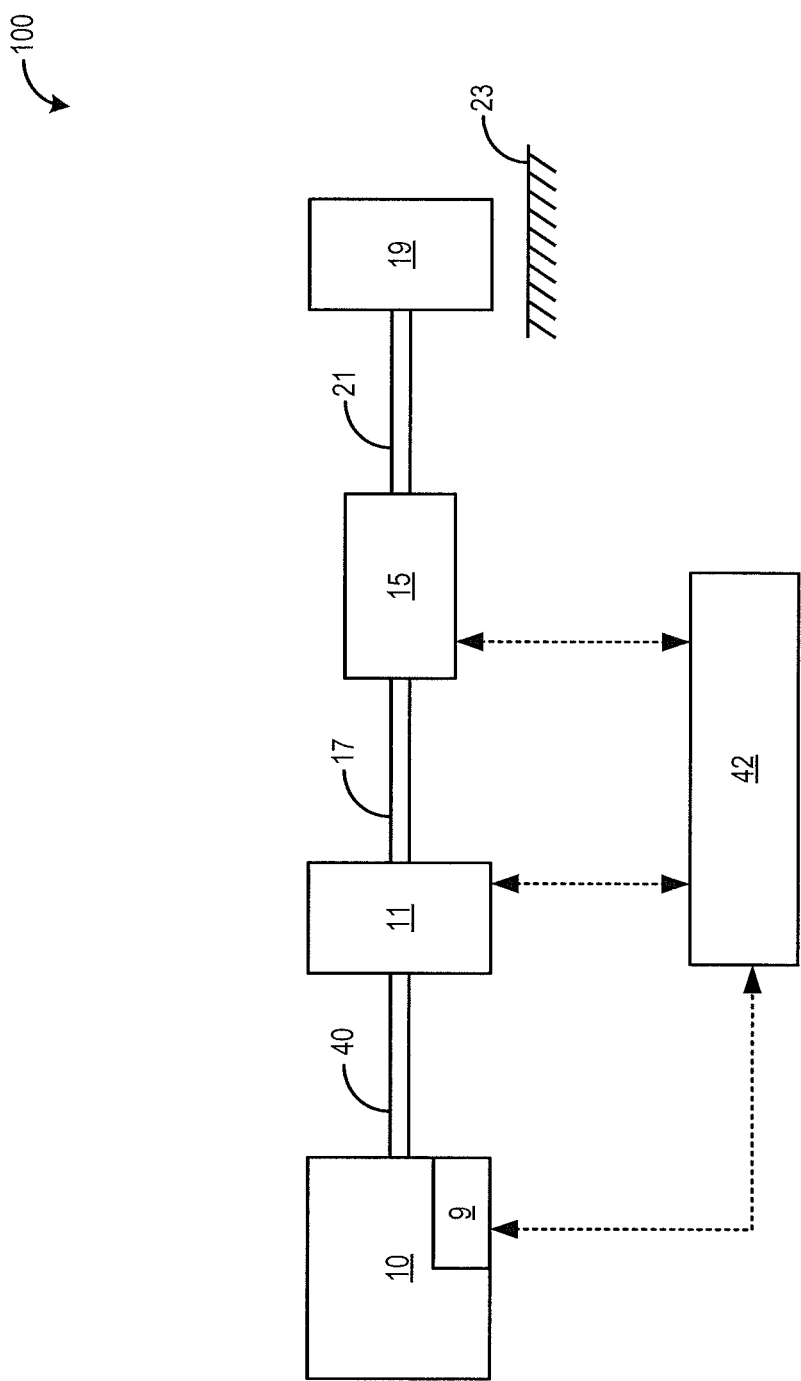
FIG. 1 shows an example vehicle drivetrain.

Referring to FIG. 1, a vehicle drivetrain 100 is shown. The drivetrain includes an internal combustion engine 10. In the depicted example, engine 10 may be selectively deactivated in response to idle-stop conditions, as further described herein with particular reference to FIGS. 3-5. Engine 10 is shown coupled to torque converter 11 via crankshaft 40. Engine 10 may include a starter system 9 for assisting in engine cranking at engine restarts. Torque converter 11 is also coupled to transmission 15 via turbine shaft 17. In one example, transmission 15 is a stepped-gear ratio transmission. Transmission 15 may further include various gears and transmission clutches to adjust a torque output from the transmission to wheels 19. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to wheel 19 via axle 21. Wheel 19 interfaces the vehicle (not shown) to the road 23. Note that in one example embodiment, this powertrain is coupled in a passenger vehicle that travels on the road. While various vehicle configurations may be used, in one example, the engine is the sole motive power source, and thus the vehicle is not a hybrid-electric, hybrid-plug-in, etc. In other embodiments, the method may be incorporated into a hybrid vehicle.

An engine controller 42 may be configured to receive inputs from engine 10 and accordingly control a torque output of the engine and/or operation of torque converter 11, transmission 15, and related clutches. As one example, a torque output may be controlled by adjusting a combination of spark timing, fuel pulse width, fuel pulse timing, and/or air charge, by controlling throttle opening and/or valve timing, valve lift and boost for turbocharged engines. In the case of a diesel engine, controller 42 may also control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 42 may selectively deactivate the engine by turning off fuel injection and spark ignition to the engine cylinders. In some embodiments, the controller may also adjust an engine throttle to bring manifold air pressures (MAP) towards barometric pressure (BP), to assist engine spin-down, while engaging the starting system 9 to the rotating engine to apply a braking torque and/or provide engine spin-down with reduced engine reversal. The engine may then be maintained in idle-stop until engine restart conditions are confirmed. As such, while the engine is spinning down to rest (un-fueled), air may be pumped through the exhaust catalysts. Likewise, during an engine restart from idle-stop, while the engine spins up, and before fueling is resumed, air may be pumped through the exhaust catalysts. This air can oxidize the catalysts, in particular, a close-coupled three-way exhaust catalyst, lowering its ability to reduce exhaust NOx species, and degrading exhaust emissions.

Figure 4:
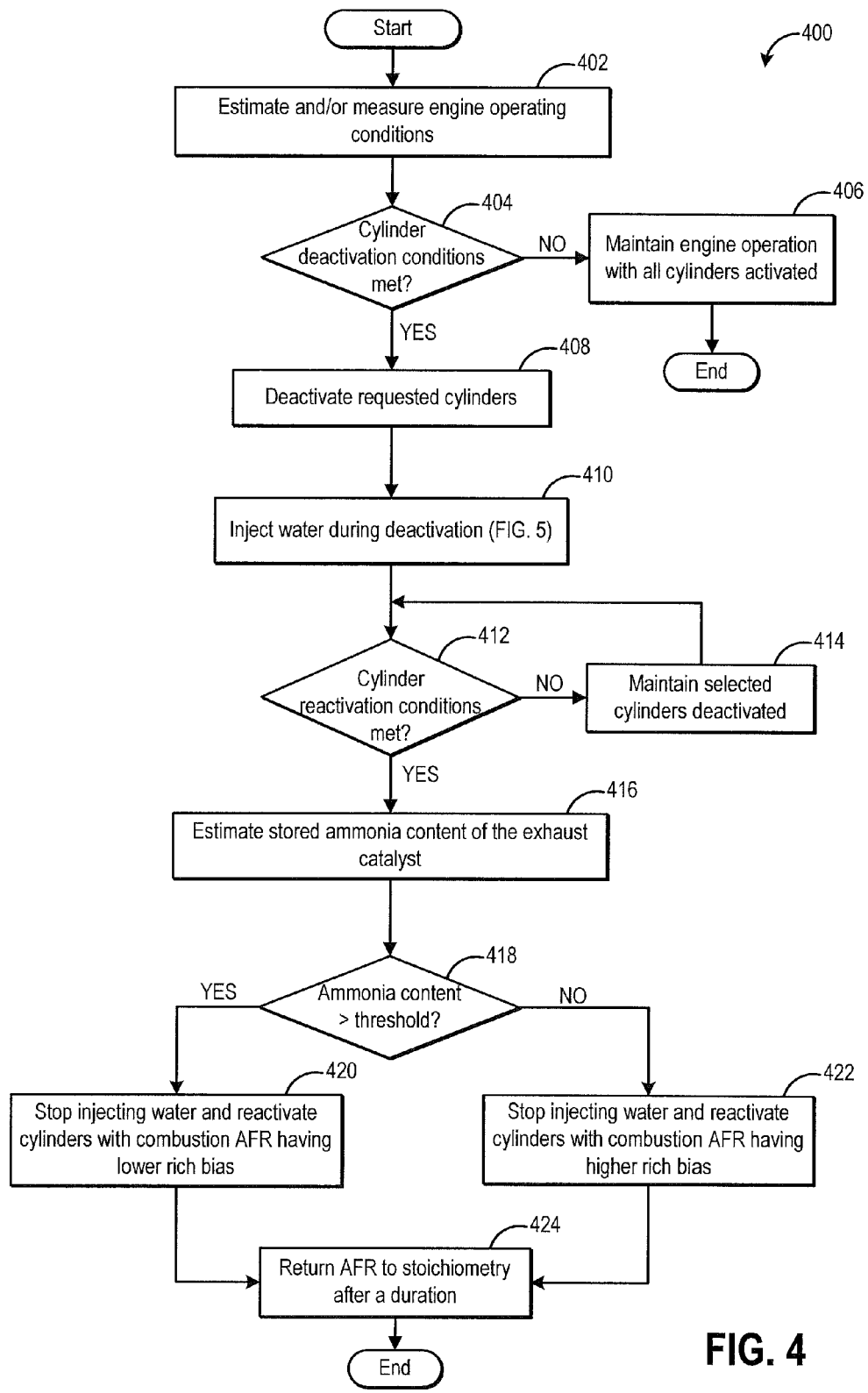
FIG. 4 shows an example method for injecting water and adjusting exhaust catalyst regeneration based on engine cylinder deactivation.
Figure 5:
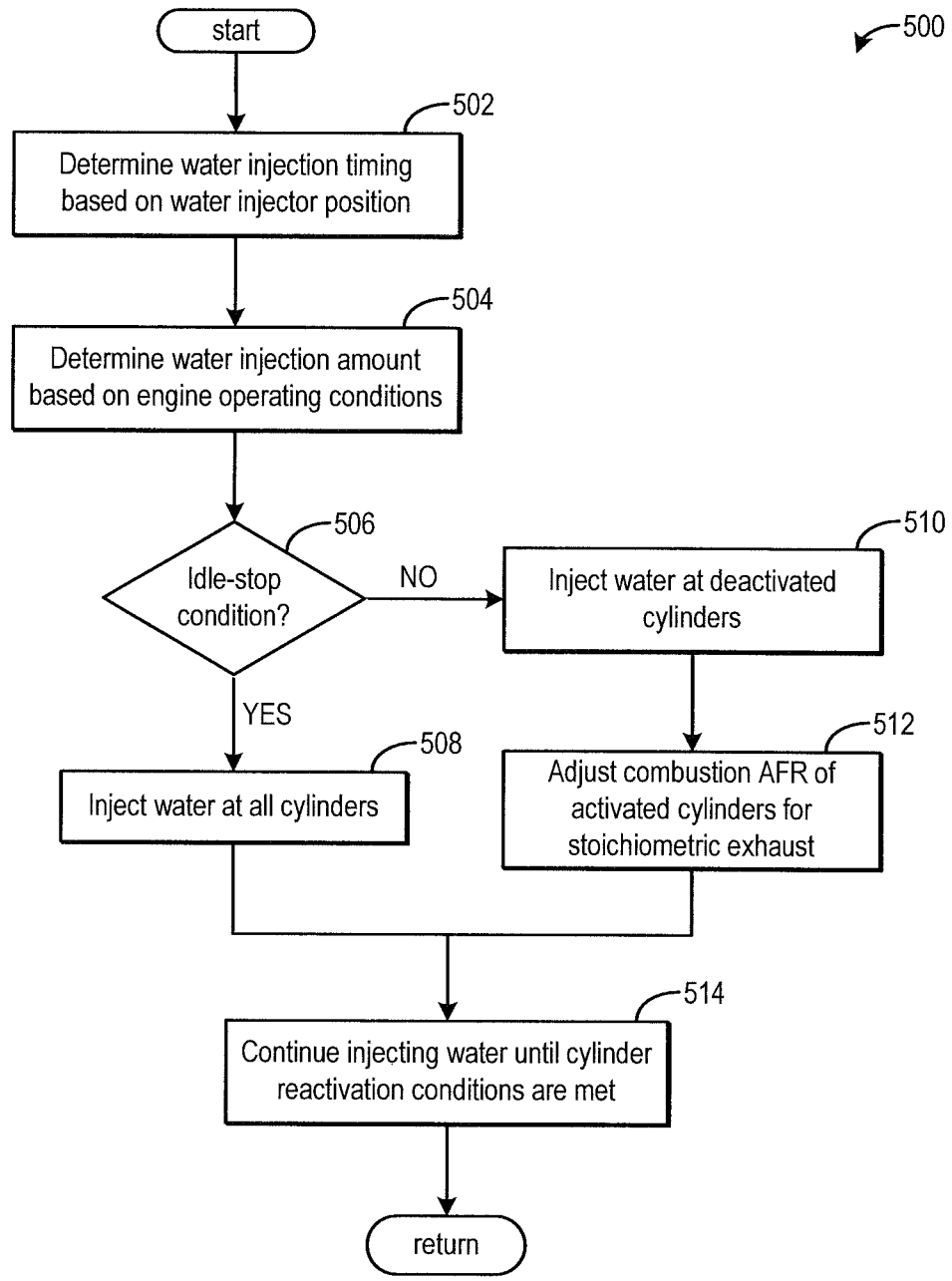
FIG. 5 shows an example method for adjusting water injection during engine cylinder deactivation.
Figure 6:
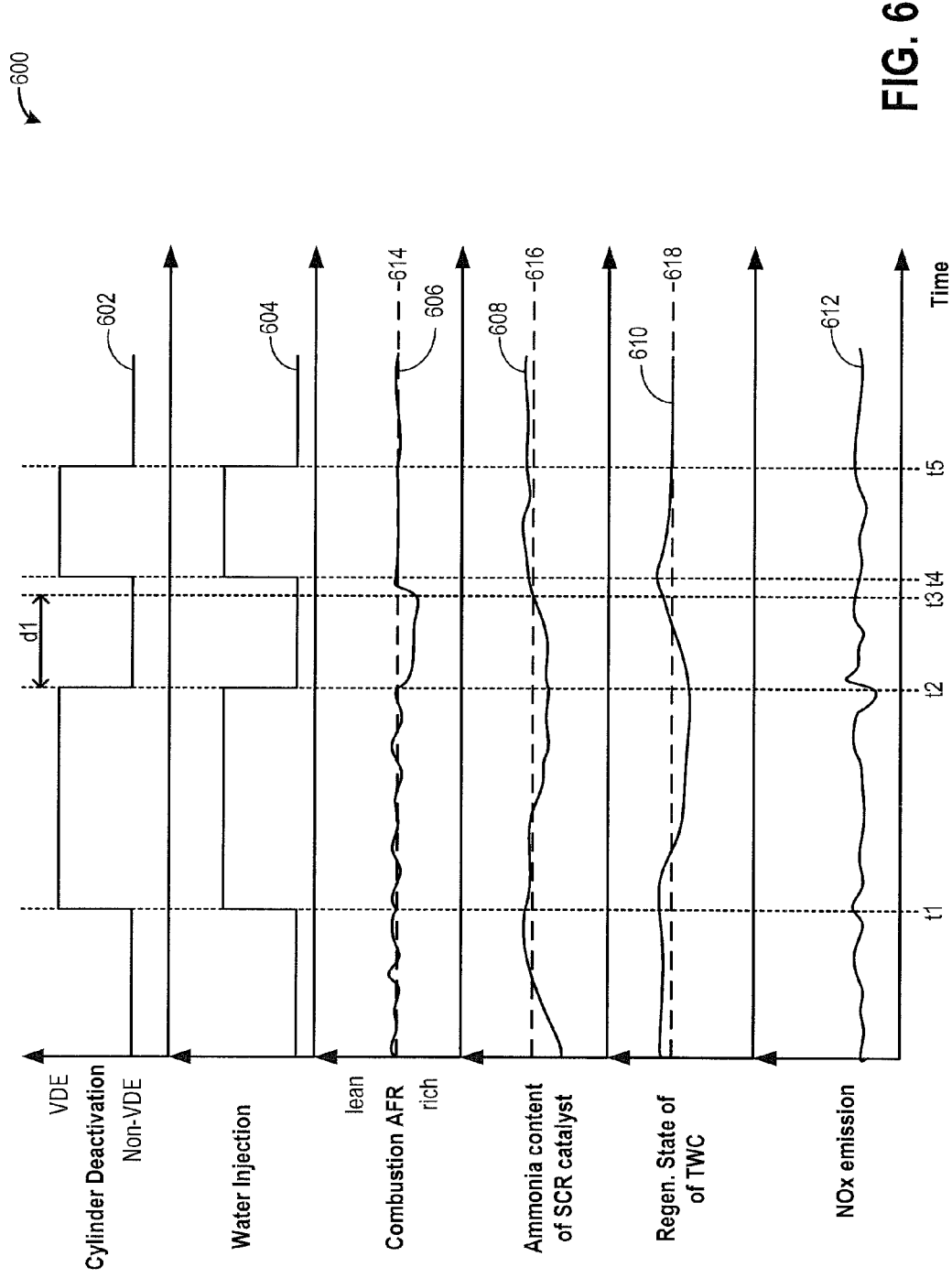
FIG. 6 shows an example of adjusting water injection and a combustion air-to-fuel ratio responsive to selective cylinder deactivation.

As elaborated at FIGS. 4-6, the engine controller may also be configured with computer readable instructions for injecting water at the engine cylinders during the deactivation. The water and/or water vapor may then displace air from the engine cylinders, thereby reducing ingestion of air of the deactivated cylinders. This may reduce the amount of air traveling to the catalysts and thus the oxidation of the catalysts. Then, during the an engine restart from idle-stop, the exhaust catalyst, such as the three-way catalyst, may be regenerated by adjusting the combustion air-to-fuel ratio of the cylinders. Specifically, the combustion air-to-fuel ratio may be decreased such that the air-to-fuel ratio has a rich bias. The amount of rich bias may be based on the ammonia content stored on an exhaust catalyst, such as an SCR catalyst. For example, if the ammonia content of the exhaust catalyst is higher, the rich bias may be lower. Injecting water during the idle-stop and cylinder deactivation may allow the ammonia content of the exhaust catalyst to remain at higher level than if water injection was not used. As such, less rich bias may be needed during the cylinder reactivation (e.g., restart). This may reduce the fuel penalty incurred in the regeneration of the exhaust catalysts, thereby improving overall fuel economy while meeting NOx emissions requirements.

Figure 2A:
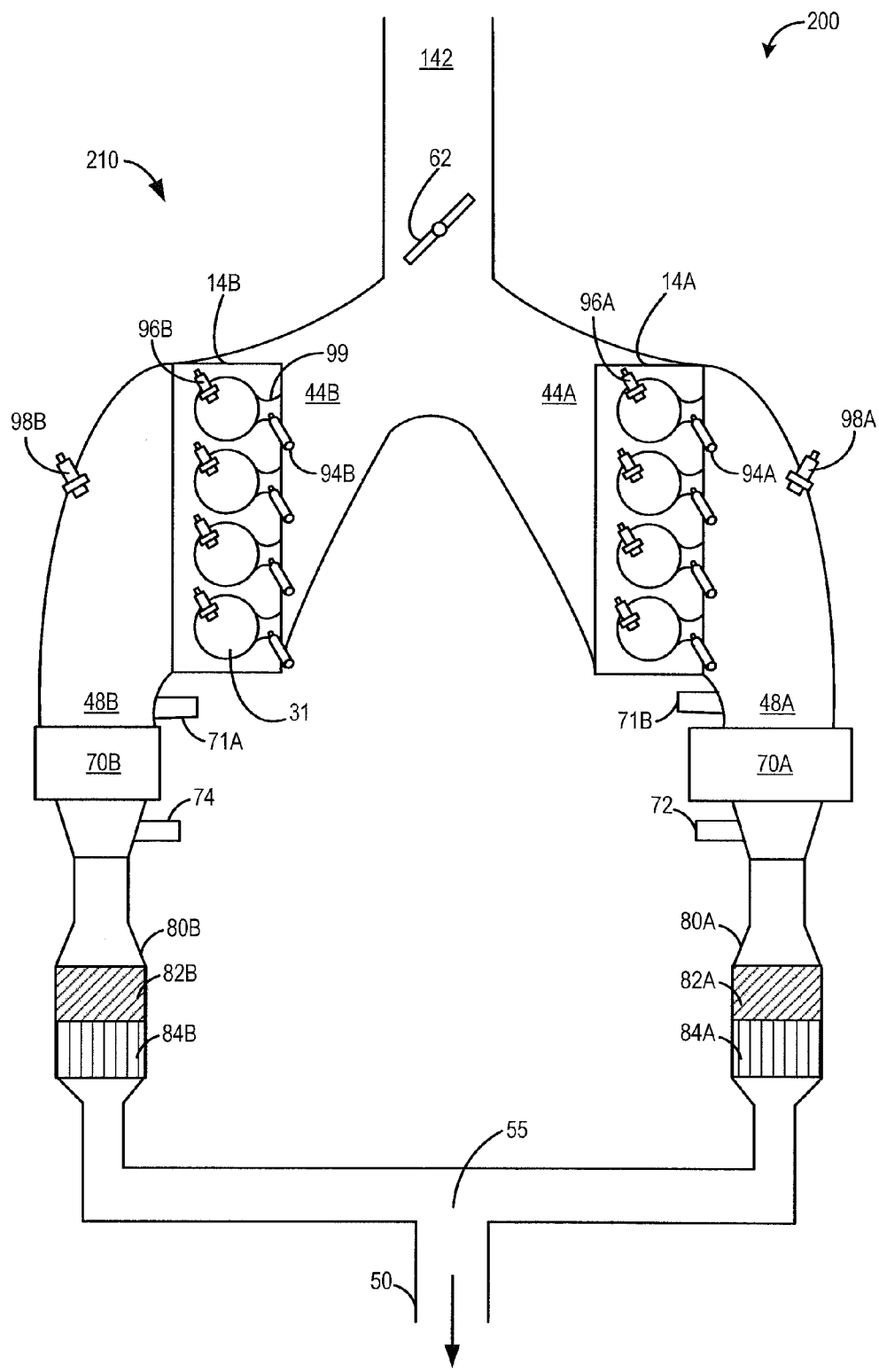
FIGS. 2A-B show example embodiments of a variable displacement engine system.
Figure 2B:
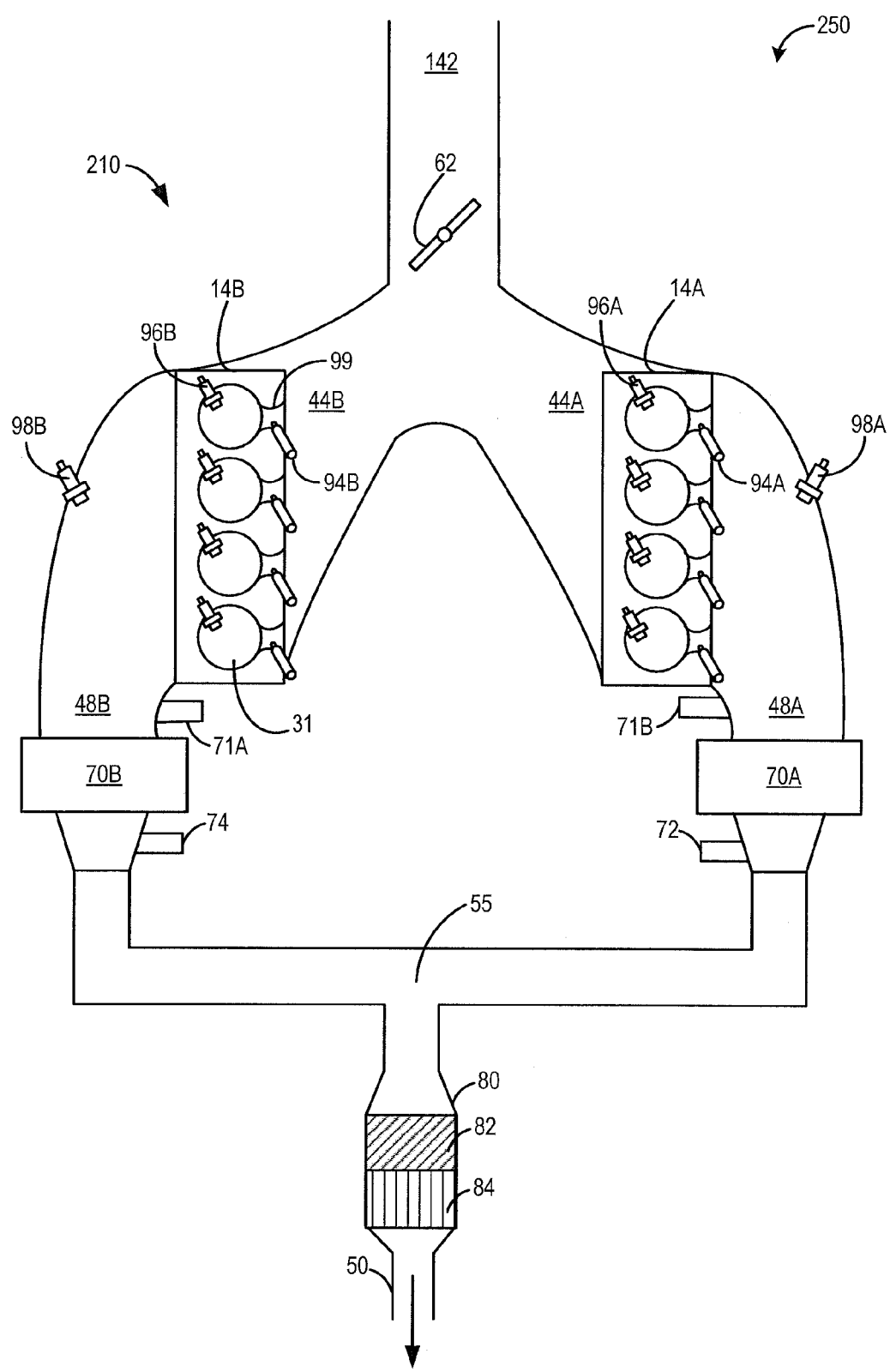

FIGS. 2A-B show example embodiments 200 and 250 of engine 210 wherein the engine is configured as a variable displacement engine (VDE). Variable displacement engine 210 includes a plurality of combustion chambers or cylinders 31. The plurality of cylinders 31 of engine 210 are arranged as groups of cylinders on distinct engine banks. In the depicted example, engine 210 includes two engine banks 14A, 14B. Thus, the cylinders are arranged as a first group of cylinders (four cylinders in the depicted example) arranged on first engine bank 14A and a second group of cylinders (four cylinders in the depicted example) arranged on second engine bank 14B. It will be appreciated that while the embodiments depicted in FIGS. 2A-B show a V-engine with cylinders arranged on different banks, this is not meant to be limiting, and in alternate embodiments, the engine may be an in-line engine with all engine cylinders on a common engine bank.

Variable displacement engine 210 can receive intake air via an intake passage 142 communicating with branched intake manifold 44A, 44B. Specifically, first engine bank 14A receives intake air from intake passage 142 via first intake manifold 44A while second engine bank 14B receives intake air from intake passage 142 via second intake manifold 44B. While engine banks 14A, 14B are shown with distinct intake manifolds, it will be appreciated that in alternate embodiments, they may share a common intake manifold or a portion of a common intake manifold. The amount of air supplied to the cylinders of the engine can be controlled by adjusting a position of throttle 62. Additionally, an amount of air supplied to each group of cylinders on the specific banks can be adjusted by varying an intake valve timing of one or more intake valves coupled to the cylinders.

With reference to FIG. 2A, combustion products generated at the cylinders of first engine bank 14A are directed to one or more exhaust catalysts in first exhaust manifold 48A where the combustion products are treated before being vented to the atmosphere. A first emission control device 70A is coupled to first exhaust manifold 48A. First emission control device 70A may include one or more exhaust catalysts, such as a close-coupled catalyst. In one example, the close-coupled catalyst at emission control device 70A may be a three-way catalyst. Exhaust gas generated at first engine bank 14A is treated at emission control device 70A before being directed to first underbody emission control device 80A. First underbody emission control device 80A may include a first underbody exhaust catalyst 82A and a second underbody exhaust catalyst 84A. In particular, the first underbody 82A and the second underbody catalyst 84A may be integrated in the underbody emission control device 80A in face-sharing contact with each other. In one example, first underbody exhaust catalyst 82A includes an SCR catalyst configured for selective catalytic reduction wherein NOx species are reduced to nitrogen using ammonia. As another example, second underbody exhaust catalyst 84A includes a three-way catalyst. First underbody exhaust catalyst 82A is positioned upstream of the second underbody exhaust catalyst 84A (in a direction of exhaust flow) in the underbody emission control device 80A but downstream of a third close-coupled exhaust catalyst (included in emission control device 70A). Exhaust that is treated upon passage through first emission control device 70A and first underbody emission control device 80A is then directed towards exhaust junction 55 along first exhaust manifold 48A. From there, the exhaust can be directed to the atmosphere via common exhaust passage 50.

Combustion products generated at the cylinders of second engine bank 14B are exhausted to the atmosphere via second exhaust manifold 48B. A second emission control device 70B is coupled to second exhaust manifold 48B. Second emission control device 70B may include one or more exhaust catalysts, such as a close-coupled catalyst. In one example, the close-coupled catalyst at emission control device 70A may be a three-way catalyst. Exhaust gas generated at second engine bank 14B is treated at emission control device 70B before being directed to second underbody emission control device 80B. Second underbody emission control device 80B may also include a first underbody exhaust catalyst 82B and a second underbody exhaust catalyst 84B. In particular, the first underbody catalyst 82B and the second underbody catalyst 84B may be integrated in the underbody emission control device 80B in face-sharing contact with each other. In one example, first underbody exhaust catalyst 82B includes an SCR catalyst while second underbody exhaust catalyst 84B includes a three-way catalyst. Second underbody exhaust catalyst 82B is positioned upstream of the second underbody exhaust catalyst 84B (in a direction of exhaust flow) in the underbody emission control device 80B but downstream of a third close-coupled exhaust catalyst (included in emission control device 70B).

While the embodiment of FIG. 2A shows each engine bank coupled to respective underbody emission control devices, in alternate embodiments, such as shown at FIG. 2B, each engine bank is coupled to respective emission control devices 70A, 70B but to a common underbody emission control device 80. In the embodiment 250 depicted at FIG. 2B, the common underbody emission control device 80 is positioned downstream of exhaust junction 55 and common exhaust passage 50. Common underbody emission control device 80 is shown with first underbody exhaust catalyst 82 positioned upstream of and integratably coupled to second underbody exhaust catalyst 84 (in a direction of exhaust flow) in the underbody emission control device 80.

Various air-to-fuel ratio sensors may be coupled to engine 210. For example, a first air-to-fuel ratio sensor 72 may be coupled to the first exhaust manifold 48A of first engine bank 14A, downstream of first emission control device 70A while a second air-to-fuel ratio sensor 74 is coupled to the second exhaust manifold 48B of second engine bank 14B, downstream of second emission control device 70B. In further embodiments, additional air-to-fuel ratio sensors may be coupled upstream of the emission control devices, such as a first upstream air-to-fuel ratio sensor 71A coupled upstream of first emission control device 70A and a second upstream air-to-fuel ratio sensor 71B coupled upstream of second emission control device 70B. Still other air-to-fuel ratio sensors may be included, for example, coupled to the underbody emission control device(s). As elaborated at FIG. 3, the air-to-fuel ratio sensors may include oxygen sensors, such as EGO, HEGO, or UEGO sensors. In one example, the downstream air-to-fuel ratio sensors 72, 74 coupled downstream of emission control devices 70A, 70B may be HEGO sensors used for catalyst monitoring while the upstream air-to-fuel ratio sensors 71A, 71B coupled upstream of emission control devices 70A, 70B are UEGO sensors used for engine control.

While FIGS. 2A-2B show an emission control device and an underbody emission control device with multiple exhaust catalysts, in alternate embodiments the emission control device or devices may include different arrangements of the exhaust catalyst. For example, an emission control system of a vehicle may include one or more emission control devices with at least one SCR catalyst and at least one three-way catalyst. These catalysts may be arranged into different configuration within the emission control system. As such, the methods described further below may be implemented in a variety of engines with different emission control system configurations.

One or more engine cylinders may be selectively deactivated during selected engine operating conditions. For example, during low engine loads when the full torque capability of the engine is not needed, one or more cylinders of a selected engine bank may be selectively deactivated (herein also referred to as a VDE mode of operation). This may include deactivating fuel and spark on the selected engine bank. Specifically, one or more cylinders of the selected group of cylinders may be deactivated by shutting off respective fuel injectors while maintaining operation of the intake and exhaust valves such that air may continue to be pumped through the cylinders. While fuel injectors of the disabled cylinders are turned off, the remaining enabled cylinders continue to carry out combustion with fuel injectors active and operating. To meet the torque requirements, the engine produces the same amount of torque on those cylinders for which the injectors remain enabled. This requires higher manifold pressures, resulting in lowered pumping losses and increased engine efficiency. Also, the lower effective surface area (from only the enabled cylinders) exposed to combustion reduces engine heat losses, improving the thermal efficiency of the engine. In one example, an engine controller may selectively deactivate all the cylinders of a given engine bank (either 14A or 14B) during shift to a VDE mode and then reactivate the cylinders during a shift back to a non-VDE mode.

In alternate examples, the engine system may have cylinders with selectively deactivatable intake and/or exhaust valves. Specifically, an intake and/or exhaust valve timing may be adjusted so that substantially no air is pumped through the inactive engine bank while air continues to flow through the active engine bank. In some embodiments, the deactivated cylinders may have cylinder valves held closed during one or more engine cycles, wherein the cylinder valves are deactivated via hydraulically actuated lifters, or via a cam profile switching (CPS) mechanism in which a cam lobe with no lift is used for deactivated valves.

By selectively deactivating engine cylinders during low engine load conditions, engine pumping losses and friction losses are reduced, and fuel economy is improved. However, unique emissions challenges are presented. For example, during non-VDE or stoichiometric engine operation, ammonia is generated by the close-coupled three-way catalyst under the slightly rich conditions typically used for closed-loop control. Therein, injection of fuel and reductant upstream of the close-coupled catalyst is adjusted based on an exhaust air-to-fuel ratio estimated downstream of the close coupled catalyst so as to maintain the air-to-fuel ratio at or around stoichiometry (e.g., slightly rich of stoichiometry) while generating ammonia for reducing of exhaust NOx species. In the absence of an underbody SCR catalyst, this ammonia can be stored on the underbody three-way catalyst due to the cooler exhaust temperatures at that location. During an onset of the VDE mode, pure air passes through one bank of the engine and the underbody three-way catalyst can oxidize the stored ammonia to NOx species and $N_2O$ using the oxygen in the fresh air. In addition, during the lean operation (that is, the VDE mode of operation), the three-way catalyst becomes oxidized which degrades its ability to reduce NOx species upon return to non-VDE/stoichiometric engine operation. In particular, the three-way catalyst is unable to reduce NOx species until the three-way catalyst has been sufficiently reduced and regenerated. To minimize the duration of this lost three-way catalyst function, significant enrichment can be used after exiting a VDE mode to quickly reduce the three-way catalyst. This enrichment not only adds a fuel penalty but also generates additional ammonia. The extra ammonia requires that the re-entry to a VDE mode be delayed to allow the ammonia to dissipate, otherwise the leftover ammonia would be oxidized to NOx and $N_2O$.

Herein, injecting water at the deactivated engine cylinders addresses at least some of these issues. In particular, water or windshield wiper fluid may be injected via direct injection or port injection at the engine cylinders. In one example, engine 210 may have a water injection system designed primarily for knock control at high engine loads. This system may then also be used for water injection and aftertreatment system catalyst regeneration during injector cutout in a VDE (e.g., during VDE mode operation). This system may either be a direct injection (DI) system or a port injection (PI) system. In one example, as shown in FIGS. 2A-B, engine 210 may have a direct water injection system. The direct water injection system may include a first set of direct water injectors 96A for the first engine bank 14A and a second set of direct water injectors 96B for the second engine bank 14B. As such, each cylinder 31 of engine 210 may have a direct water injector. In another example, as shown in FIGS. 2A-B, engine 210 may include a port water injection system. The port water injection system may include a first set of port water injectors 94A for the first engine bank 14A and a second set of port water injectors 94B for the second engine bank 14B. The port water injectors may be positioned within an intake port 99, which includes an intake valve, for each cylinder 31. As such, each intake port 99 of each cylinder 31 of engine 210 may have a port water injector. In yet another example, engine 210 may include a first exhaust port water injector 98A positioned in the first exhaust manifold 48A and a second exhaust port water injector 98B positioned in the second exhaust manifold 48B. If the deactivated cylinders are only on the first engine bank, only the first port water injector 98A may inject water. If the deactivated cylinders are only on the second engine bank, only the second port injector 98B may inject water. Alternatively, if all the engine cylinders (e.g., on both banks) are deactivated, both the first port injector 98A and the second port injector 98B may inject water.

Injecting water at the deactivated engine cylinders may decrease the amount of air traveling through the cylinders 31, to the exhaust manifold, and to the exhaust catalysts. For example, if the water injection system used in engine 210 is the port water injection system 94, a port water injector may inject water at the intake port, on the intake valve of the deactivated cylinder. In one example, water injection via the port water injection may occur during the cylinder deactivation, before the intake valve opens (e.g., while the intake valve is closed). The injected water may vaporize on and/or around the intake valve. The injected water and/or water vapor may then displace intake air surrounding the intake port. Thus, when the intake valve opens, the water and/or water vapor may displace the intake air, thereby reducing the amount of intake air entering the cylinder. As such, when the exhaust valve of the non-firing (e.g., deactivated) cylinder opens, the water vapor may travel through the exhaust system and to the exhaust catalysts. Any air that passes through the exhaust system may be diluted by the water. Further, oxygen passing through the exhaust system may be reduced having been displaced by water vapor, thereby reducing the oxidation of the exhaust catalysts.

An engine controller may actuate the water injectors of the corresponding deactivated cylinders to inject water during the cylinder deactivation. The controller may control the timing, duration, and amount of water injection. In response to the deactivation of one or more engine cylinders, the controller may actuate water injectors to inject an amount of water into one of the intake port, the engine cylinder, or the exhaust manifold. In a preferred embodiment, the controller may actuate port water injectors to inject water before the intake valve opens. In another embodiment, the controller may actuate direct water injectors to inject water just before the intake valve opens, near top dead center in the combustion stroke. However, in this embodiment the water may not have enough time to expand and displace the air. Thus, by injecting the water near top dead center in the combustion stroke, the heat in the combustion chamber may better vaporize the injected water. In yet another embodiment, the controller may actuate port water injectors in the exhaust manifolds to inject water into the exhaust manifold corresponding to the deactivated cylinder bank before the exhaust valve opens. The controller may then stop water injection in when cylinder reactivation conditions are met.

The controller may further control the amount of water injected at one time into the deactivated cylinders. As discussed further below at FIG. 5, the amount of water injected may be based on a volume of the engine cylinder. Specifically, the amount of water injected at the intake port or directly into the engine cylinder may correspond to the amount of water that may substantially fill the cylinder with water vapor. As such, this amount water vapor may reduce the available space for air to enter the cylinder and reach the exhaust system and exhaust catalysts. A volume of water vapor formed by an amount of injected water may increase with increasing temperature. Thus, the amount of water injected at the deactivated cylinders may be based on an engine cylinder volume and intake port and/or manifold temperature. The amount of water injected may be further based on additional engine operating conditions such as manifold pressure, MAP, estimated piston valve and head temperatures, and/or engine speed.

In this way, injecting water at the deactivated cylinders may reduce air entering the combustion chamber and subsequently, the exhaust pipe, which will reduce the oxygen concentration reaching the exhaust catalyst, thereby reducing the amount of catalyst reduction and the amount of catalyst regeneration required after reactivating the cylinders. Injected water may act to displace intake air and reduce the amount of oxygen flowing through the deactivated cylinders and into the exhaust manifold. Further, water and/or water vapor traveling through the exhaust system may react with hydrocarbons across the first exhaust catalyst to form CO and $H_2$ in a steam forming reaction. The $H_2$ may then reduce NO across the catalyst to form ammonia, $NH_3$.

After the engine cylinders are reactivated, the engine controller may then adjust a combustion air-to-fuel ratio during the cylinder reactivation based on an amount of ammonia stored on the SCR catalyst at the time of reactivation. In one example, the cylinders may be reactivated with a combustion air-to-fuel ratio that is richer than stoichiometry. If the amount of ammonia in the SCR catalyst is below a threshold level at cylinder reactivation, the richer combustion air-to-fuel ratio may have a higher rich bias. However, if the amount of ammonia in the SCR catalyst is greater than the threshold level at cylinder reactivation, the richer combustion air-to-fuel ratio may have a lower rich bias. The rich air-to-fuel ratio may be combusted for a duration in order to regenerate the three-way catalyst (e.g., the close-coupled catalyst). In this way, the regeneration requirements for the close-coupled catalyst may be reduced depending on how much ammonia is stored in the SCR catalyst.

By injecting water at the deactivated engine cylinders during cylinder deactivation, less oxygen may enter the exhaust system, thereby reducing oxidation of a first exhaust catalyst (e.g., a three-way catalyst). Additionally, water may increase ammonia formation at a second exhaust catalyst (e.g., SCR catalyst), thereby increasing the amount of ammonia available during cylinder reactivation. As such, injecting water may reduce the amount of rich bias required after reactivating the engine cylinders, thereby reducing the fuel penalty incurred during regeneration of the first catalyst.

Figure 3:
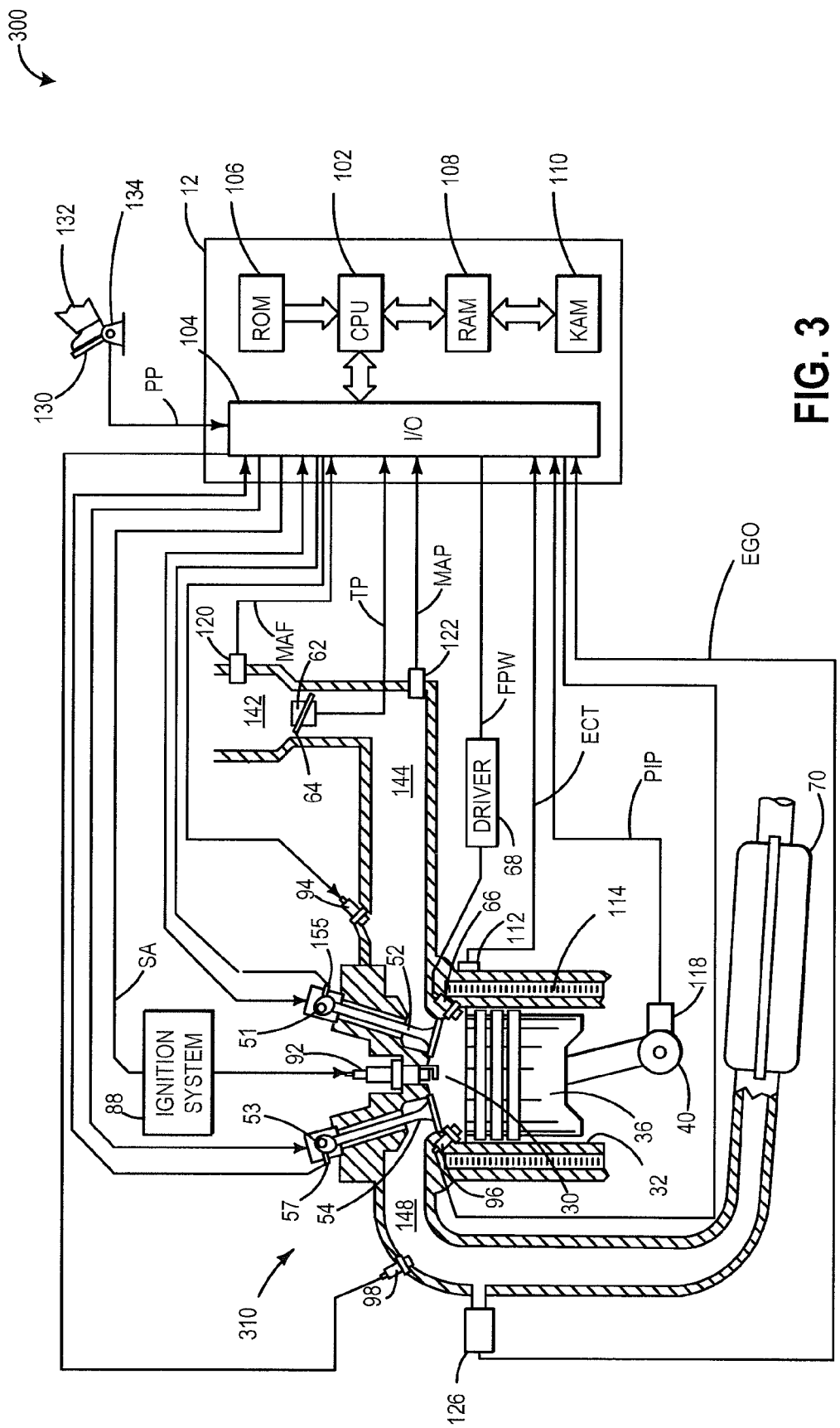
FIG. 3 depicts a partial engine view.

FIG. 3 is a schematic diagram 300 showing one cylinder of multi-cylinder engine 310, which may be included in a propulsion system of an automobile. Engine 310 may be a variable displacement engine, such as engine 210 of FIGS. 2A-B and/or may be configured to be selectively deactivated responsive to idle-stop conditions, such as engine 10 of FIG. 1. Engine 310 may be controlled at least partially by a control system including controller 12 and by input from a vehicle operator 132 via an input device. In one example, the input device includes an accelerator pedal 130 and a pedal position sensor 134 for generating a proportional pedal position signal PP.

Combustion chamber 30 of engine 310 may include cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 310.

Combustion chamber 30 may receive intake air from intake manifold 144 via intake passage 142 and may exhaust combustion gases via exhaust passage 148. Intake manifold 144 and exhaust passage 148 can selectively communicate with combustion chamber 30 via respective intake valve 52 and exhaust valve 54. In some embodiments, combustion chamber 30 may include two or more intake valves and/or two or more exhaust valves. Exhaust camshaft 53 operates exhaust valve 54 in accordance with the profile of a cam located along the length of the exhaust camshaft. Intake camshaft 51 operates intake valve 52 in accordance with the profile of a cam located along the length of the camshaft. Exhaust cam position sensor 57 and intake cam position sensor 155 relay respective camshaft positions to controller 12.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 144 in a configuration that provides what is known as port injection of fuel into the intake port upstream of combustion chamber 30.

Intake passage 142 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 142 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 310 may include a water injection system, such as the water injection system described in FIGS. 2A-B above. The water injection system may include a water injector for each cylinder for injecting water or windshield wiper fluid. The water injection system and water injectors in engine 310 may be similar to the water injectors and systems discussed above for engine 210. In one example, a port water injector 94 may be positioned within the intake manifold 144 at an intake port and/or near the intake valve 52. In another example, a direct water injector 96 may be positioned within the combustion chamber 30 (e.g., cylinder). In this example, the direct water injector 96 may inject water directly into the engine cylinder. In yet another example, a second port water injector 98 may be positioned within the exhaust passage 148, downstream from the exhaust valve 54. The controller 12 may actuate one or more of the water injectors to inject water. Further, the controller may adjust the timing of and the amount of water injected by the water injectors.

For example, during an idle-stop condition, the controller may deactivate one or more of the engine cylinders. In one example, all engine cylinders may be deactivated during the idle-stop conditions. During the deactivation, the controller may actuate the water injectors at the deactivated cylinders to inject water. As discussed above, water injection may reduce the amount of air and oxygen traveling across the exhaust catalysts, thereby reducing the oxidation of the catalysts and subsequently the amount of required catalyst regeneration upon cylinder reactivation (e.g., restart conditions after the idle-stop).

Exhaust gas sensor 126 is shown coupled to exhaust passage 148 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 148 downstream of exhaust gas sensor 126. Device 70 may be a three way catalyst (TWC), NOx trap, SCR catalyst, various other emission control devices, or combinations thereof. In some embodiments, during operation of engine 310, emission control device 70 may be periodically reset by operating at least one cylinder of the engine within a particular air/fuel ratio.

Controller 12 is shown in FIG. 3 as a microcomputer, including microprocessor unit 102, input/output ports 104, an electronic storage medium for executable programs and calibration values shown as read-only memory 106 in this particular example, random access memory 108, keep alive memory 110, and a data bus. Controller 12 may receive various signals from sensors coupled to engine 310, in addition to those signals previously discussed, including measurement of inducted mass air flow (MAF) from mass air flow sensor 120; engine coolant temperature (ECT) from temperature sensor 112 coupled to cooling sleeve 114; vehicle brake; a profile ignition pickup signal (PIP) from Hall effect sensor 118 (or other type) coupled to crankshaft 40; throttle position (TP) from a throttle position sensor; and absolute manifold pressure signal, MAP, from manifold pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor unit 102 for performing the methods described below as well as other variants that are anticipated but not specifically listed.

Controller 12 also receives signals from and provides control signals to a transmission (not shown). Transmission signals may include but are not limited to transmission input and output speeds, signals for regulating transmission line pressure (e.g., fluid pressure supplied to transmission clutches), and signals for controlling pressure supplied to clutches for actuating transmission gears.

As described above, FIG. 3 shows only one cylinder of a multi-cylinder engine, and that each cylinder may similarly include its own set of intake/exhaust valves, fuel injector, spark plug, etc.

The systems of FIGS. 1-3 provide for an engine system including an engine which includes an intake manifold and an engine cylinder. The engine cylinder has an intake port with an intake valve and a deactivatable fuel injector. The engine system further includes a water injection system having a water injector positioned in the intake port, upstream of the intake valve, for injecting water on the intake valve and an emission control device having a first exhaust catalyst and a second exhaust catalyst. The engine system also includes a controller with computer readable instructions for selectively deactivating one or more engine cylinders via deactivatable fuel injectors and injecting water at the one or more deactivated engine cylinders during the deactivation to reduce oxidation of the first exhaust catalyst. After the deactivation, the controller may stop water injection, reactivate the one or more deactivated engine cylinders, and adjust a combustion air-to-fuel ratio of the reactivated engine cylinders based on an ammonia content stored in the second exhaust catalyst.

In this way, one or more engine cylinders may be selectively deactivated via deactivatable fuel injectors. Then, during cylinder deactivation, water may be injected at the one or more deactivated engine cylinders to reduce oxidation of a first exhaust catalyst. In one example, injecting water at the one or more deactivated cylinders may include port injecting water on a closed intake valve of the one or more deactivated engine cylinders before the intake valve opens. In another example, injecting water at the one or more deactivated cylinders may include direct injecting water into the one or more deactivated engine cylinders before an intake valve of the one or more deactivated engine cylinders opens. In yet another example, water may be injected at an exhaust manifold of the one or more deactivated engine cylinders before an exhaust valve of the one or more deactivated engine cylinders opens.

An engine controller may adjust an amount of water injected during the injecting water based on one or more of an engine cylinder volume, engine temperature, engine speed, and a manifold pressure. Further, the engine controller may estimate an ammonia content stored in a second exhaust catalyst after engine cylinder reactivation conditions are met. Then, in response to the engine cylinder reactivation conditions being met, water injection may be stopped and the one or more deactivated engine cylinders may be reactivated. The method may further include adjusting a combustion air-to-fuel ratio of the reactivated engine cylinders based on the ammonia content stored in the second exhaust catalyst. The combustion air-to-fuel ratio may decrease with decreasing ammonia content.

In one example, selectively deactivating one or more engine cylinders may include deactivating all engine cylinders responsive to an idle-stop condition. In another example, selectively deactivating one or more engine cylinders may include deactivating one or more engine cylinders responsive to a torque demand below a threshold. As one example, one or more engine cylinders may be deactivated while other engine cylinders continue combusting. For example, a method for selectively deactivating engine cylinders may include deactivating only some of the engine cylinders while the remaining engine cylinder continue operating by continuing fuel injection and combustion of the remaining active cylinders.

Now turning to FIG. 4, method 400 shows an example routine for injecting water and adjusting exhaust catalyst regeneration based on engine cylinder deactivation. In particular, the method includes injecting water at deactivated engine cylinders to reduce the oxidation of the exhaust catalyst. As one example, engine cylinder deactivation may result from idle-stop operation in a VDE or non-VDE engine. In another example, engine cylinder deactivation may include cylinder deactivation operations in a VDE engine. Then, during subsequent cylinder reactivation, less exhaust catalyst regeneration may be required. In one example, the exhaust catalyst may be a first exhaust catalyst such as a three-way catalyst. An engine controller, such as engine controller 42 and controller 12 discussed at FIGS. 1-3, may include instructions stored thereon for executing method 400.

At 402, the method includes estimating and/or measuring vehicle and engine operating conditions. These may include, for example, MAP, air-to-fuel ratio (AFR), exhaust flow rate, exhaust temperature, vehicle speed, engine speed, state of charge of a system battery, ambient temperature and pressure, engine or manifold temperature, crankshaft speed, transmission speed, fuels available, fuel alcohol content, etc. At 404, the controller may determine if cylinder deactivation conditions have been met. In one example, this may include determining if idle-stop conditions have been met. Idle-stop conditions may include, for example, the engine operating (e.g., carrying out combustion), the battery state of charge being above a threshold (e.g., more than 30%), vehicle speed being below a threshold (e.g., no more than 30 mph), no request for air conditioning being made, engine temperature (for example, as inferred from an engine coolant temperature) being above a threshold, no start being requested by the vehicle driver, driver requested torque being below a threshold, brake pedals being pressed, etc. In an alternate embodiment, it may be determined if a shutdown request has been received from the vehicle operator. In one example, a shutdown request from the vehicle operator may be confirmed in response to a vehicle ignition being moved to a key-off position. If an operator requested shutdown is received, the engine may be similarly deactivated by shutting off fuel and/or spark to the engine cylinders, and the engine may slowly spin down to rest.

In another example, cylinder deactivation conditions may include determining if engine torque demand is less than a threshold. For example, based on the estimated operating conditions, the routine may determine an engine mode of operation (e.g., VDE or non-VDE). As one example, cylinder deactivation conditions may be confirmed when torque demand is less than a threshold. If cylinder deactivation conditions or any of the idle-stop conditions are not met at 404, the routine may end with the engine operating with all engine cylinders activated and firing.

However, if any or all of the idle-stop conditions are met or any of the VDE mode conditions are met, then at 408, the controller may deactivate the requested cylinders. For example, if idle-stop conditions are met, the controller may execute an automatic engine idle-stop operation and selectively deactivate the engine in response to the idle-stop. This may include shutting off fuel injection and/or spark ignition to the engine. For example, selectively deactivatable fuel injectors of selected cylinders may be deactivated and spark ignition to the selected cylinders may be discontinued. Upon deactivation, the engine may start spinning down to rest. In another example, if VDE mode conditions are met, the routine may selectively deactivate one or more selected engine cylinders at 408. This may include selectively deactivating fuel to the one or more selected engine cylinders so that fuel is not combusted in the cylinders. However, air may continue to flow through the deactivated cylinders.

At 410, the method includes injecting water via water injectors at the deactivated cylinders during the cylinder deactivation. This may include injecting water into deactivated cylinders with direct water injection or port injecting water at the intake port and valve or at the exhaust manifold with port water injection. Details on determining the amount of water injected and adjusting water injection during cylinder deactivation are presented at FIG. 5.

At 412 the method includes determining if cylinder reactivation conditions have been met. In one example, this includes determining if the engine can/should be shifted back to a non-VDE mode of operation. In this example, cylinder reactivation conditions may be confirmed in response to, for example, a driver torque demand being higher than a threshold level (e.g., during a tip-in). As another example, cylinder reactivation conditions may be confirmed after the engine has been operated with cylinder deactivation (that is, in the VDE mode) for a defined duration.

In another example, cylinder reactivation conditions may include engine restart conditions. Engine restart conditions may include, for example, the engine being in idle-stop (e.g., not carrying out combustion), the battery state of charge being below a threshold (e.g., less than 30%), vehicle speed being above a threshold, a request for air conditioning being made, engine temperature being below a threshold, emission control device temperature being below a threshold (e.g., below a light-off temperature), driver requested torque being above a threshold, vehicle electrical load being above a threshold, brake pedals being released, accelerator pedal being pressed, etc. If cylinder reactivation conditions are not met, at 414, the engine may be maintained in the idle-stop or VDE mode of operation with one or more engine cylinders selectively deactivated.

In comparison, if the cylinder reactivation conditions are met at 412, the method continues on to 416 to estimate a stored ammonia content of a second exhaust catalyst. In one example, the second exhaust catalyst may be an SCR catalyst. The amount of ammonia stored on the second catalyst may depend on various factors that contribute to ammonia being produced and stored on the catalyst as well as various factors that contribute to ammonia being drawn out (e.g., consumed or dissipated) from the second exhaust catalyst. These include, for example, a temperature, flow rate, and air-to-fuel ratio of exhaust flowing through the second catalyst. The ammonia content of the second catalyst may be further based on the type of lean event (e.g., VDE mode vs. idle-stop operation), the duration of the lean event, the duration since the last lean event, feedgas (FG) NOx mass, and engine operating conditions, such as air-to-fuel ratio, during non-lean events.

At 418, the controller may determine if the determined ammonia content of the second exhaust catalyst is greater than a threshold level. The threshold level may indicate how much regeneration of the first exhaust catalyst is required. For example, as the ammonia content of the second exhaust catalyst increases, less regeneration of the first exhaust catalyst may be required. Reactivating the engine cylinders may include resuming spark ignition and reactivating the cylinder fuel injectors. Additionally, fueling to the cylinders may be adjusted so that the exhaust air-to-fuel ratio has a higher or lower rich bias, the higher or lower rich bias based on the ammonia content of the second exhaust catalyst in comparison to the threshold level.

As such, if the ammonia content of the second exhaust catalyst is greater than the threshold level at 418, the controller may reactivate the cylinders at 420 with a combustion air-to-fuel ratio (AFR) having a lower rich bias. In some examples, this may include an air-to-fuel ratio slightly less than the stoichiometric ratio. In other example, this may include an air-to-fuel ratio at stoichiometry. For example, if no regeneration of the first exhaust catalyst is needed, the cylinder may be reactivated and operated at stoichiometry. As such, the amount of lower rich bias may decrease with increasing ammonia content of the second exhaust catalyst and decreasing required regeneration of the first exhaust catalyst. The method at 420 further includes stopping water injection at the cylinders when reactivating the one or more deactivated engine cylinders.

Alternatively, if the ammonia content of the second exhaust catalyst is not greater than (e.g., less than) the threshold level, the method continues on to 422. At 422 the controller may stop injecting water and reactivate the engine cylinders with a combustion air-to-fuel ratio (AFR) having a higher rich bias. As such, the combustion air-to-fuel ratio used at 422 is richer than the combustion air-to-fuel ratio used at 420. In this way, the combustion air-to-fuel ratio of the reactivated cylinders may be richer when the ammonia content of the second exhaust catalyst is lower.

In one example, the adjusting the combustion air-to-fuel ratio of the reactivated engine cylinders at 420 and 422 may be carried out for a duration, based on the estimated ammonia content of the second exhaust catalyst and the emission control system configuration. As such, after the duration, the combustion air-to-fuel ratio of the reactivated cylinders may return to stoichiometry. For example, as the ammonia content estimated at 416 increases, the duration of combusting the richer air-to-fuel ratio may decrease. In another example, if the engine is a VDE engine with both cylinder banks sharing a common underbody emission control device (as shown in FIG. 2B), less oxidation of the first exhaust catalyst may occur, thereby reducing the amount of regeneration required. As such, the duration at 420 or 422 may be decreased. Alternatively, if the engine in a VDE engine with each cylinder bank having its own underbody emission control device (as shown in FIG. 2A) or all engine cylinder are deactivated (e.g., for an idle-stop condition), increased oxidation of the first exhaust catalyst may occur, thereby increasing the amount of regeneration required. As such, the duration at 420 or 422 may increase.

After waiting the determined duration, at 424 the air-fuel-ratio may be returned to stoichiometry. In one example, the combustion air-fuel-ratio of the reactivated cylinders may be increased from the adjusted or richer air-fuel-ratio (with higher or lower rich bias) to the stoichiometric ratio. Alternatively at 424, the controller may continue to monitor the ammonia content of the second exhaust catalyst. Then, when the ammonia content is greater than a second threshold level the controller may stop adjusting the air-fuel-ratio of the reactivated cylinders and return the air-fuel-ratio to stoichiometry. The second threshold level may be a level which indicates that the first exhaust catalyst is regenerated.

As described at 410 in method 400, during cylinder deactivation water may be injected with a water injection system. FIG. 5 presents a method 500 for adjusting water injection during cylinder deactivation. In particular, an engine controller, such as engine controller 42 and controller 12, may actuate water injectors of corresponding deactivated cylinders to inject water during the cylinder deactivation. The controller may control the timing, duration, and amount of water injection.

Specifically, in response to the deactivation of one or more engine cylinders at 408 in method 400, the controller may actuate water injectors to inject an amount of water into one of the intake port, the engine cylinder, or the exhaust manifold. The location of water injection may be based on the water injection system of the engine. For example, an engine may include a direct water injection system with water injectors positioned in each engine cylinder for directly injecting water into the cylinder. In another example, the engine may include a port water injection system with water injectors positioned in an intake port of each cylinder, upstream of an intake valve, for injecting water on or near the intake valve. In yet another example, the engine may include a different port water injection system with water injectors positioned in one or more exhaust manifolds for injecting water into the exhaust manifolds. For example, if the engine has more than one cylinder bank, a water injection may be positioned in the exhaust manifold of each cylinder bank.

At 502, the method may include determining an injection timing of the water injection based on the injector position. For example, water injection may occur before the opening of the intake valve if the water injectors are positioned in the intake port of the cylinder. In another example, water injection may also occur before the opening of the intake valve if the water injectors are direct water injectors positioned in the engine cylinder. In yet another example, water injection may occur before the opening of the exhaust valve if the water injectors are port water injectors positioned in the one or more exhaust manifolds.

At 504, the controller may then determine the amount of water injected for each water injection event during the cylinder deactivation (e.g., one water injection event may occur for each intake/exhaust cycle of the engine). The amount of water injected may be based on a volume of the engine cylinder. Specifically, the amount of water injected at the intake port or directly into the engine cylinder may correspond to the amount of water that may substantially fill the cylinder with water and/or water vapor. As such, this amount of water and/or water vapor may reduce the available space for air to enter the cylinder and reach the exhaust system and exhaust catalysts. A volume of water vapor formed by an amount of injected water may increase with increasing temperature. Thus, the amount of water injected at the deactivated cylinders may be based on an engine cylinder volume and intake manifold temperature (or engine temperature). The amount of water injected may be further based on additional engine operating conditions such as manifold pressure, MAP, estimated piston valve and head temperatures, and/or engine speed.

In some embodiments, the controller may also adjust valve timing of the intake and exhaust valves during the cylinder deactivation and water injection. For example, by delaying exhaust valve closing, the intake and exhaust valves may be open together (e.g., valve overlap). This may increase internal exhaust gas recirculation (EGR), thereby reducing the amount of fresh, intake air entering the engine cylinder. Reducing the amount of intake air entering the cylinder may in turn reduce the amount of oxygen reaching the exhaust catalysts during cylinder deactivation. In some embodiments, increased valve overlap may be used in conjunction with water injection to reduce the total amount of water injected during the cylinder deactivation. In this embodiment, the method at 504 may include determining a valve timing adjustment to increase internal EGR. The amount of water determined at 504 may then be further based on the amount of internal EGR created by the adjusted valve timing. In this way, a larger amount of valve overlap may result in a smaller amount of water injected for each water injection event.

Moving on to 506, the method includes determining if the cylinder deactivation was due to an idle-stop condition wherein all the cylinders were deactivated. Alternatively, the method at 506 may include determining if all the engine cylinders were deactivated for a reason other than the idle-stop condition. If all the engine cylinders are deactivated, the method continues on to 508 to inject water at all of the engine cylinders. This may include injecting the determined amount of water at the determined timing for the duration of the cylinder deactivation. Thus, as the duration of cylinder deactivation increases, the number of water injection events and subsequently the total amount of water injected may increase.

Alternatively, if less than all of the engine cylinders are deactivated, the method continues on from 506 to 510. At 510, the controller may inject water at the one or more selectively deactivated cylinders. Thus, only the water injectors at the deactivated cylinder may inject water during the cylinder deactivation. The method at 510 may include injecting the determined amount of water at the determined timing for the duration of the cylinder deactivation. At 512, the controller may adjust the combustion air-to-fuel ratio of the activated (e.g., firing) cylinders during the selective cylinder deactivation. In one example, the controller may adjust the combustion air-to-fuel ratio of the activated cylinders to achieve a stoichiometric exhaust gas mixture. Alternatively, the controller may adjust the combustion air-to-fuel ratio of the activated cylinders to be slightly richer than stoichiometry. The combustion air-to-fuel ratio of the activated cylinders may be based on the exhaust system configuration. For example, if one or more of the emission control devices are shared in a VDE engine, the combustion air-to-fuel ratio may be decreased (e.g., enriched) to aid in regeneration of the exhaust catalyst. Alternatively, if each exhaust manifold in a VDE engine has its own emission control device, the combustion air-to-fuel ratio of the activated cylinders may be adjusted to maintain a stoichiometric exhaust. Since water injection may reduce oxidation of the exhaust catalyst, thereby requiring less regeneration, the controller may adjust the combustion air-to-fuel ratio of the activated cylinders to maintain a stoichiometric exhaust regardless of the exhaust system configuration.

The methods at 510 and 512 may occur concurrently and continuously during the cylinder deactivation. At 514, the water injection may continue until cylinder reactivation conditions are met. The method then returns to 412 in method 400.

FIG. 6 shows an example of adjusting water injection and a combustion air-to-fuel ratio responsive to selective cylinder deactivation. Specifically, graph 600 shows changes between a VDE and non-VDE mode at plot 602. During engine operation in the VDE mode, one or more engine cylinders may be selectively deactivated by stopping fuel injection (e.g., fuel injector cutout) while the other cylinders remain activated. Changes in operation of a water injection system are shown at plot 604. Specifically, plot 604 may illustrate a change from not injecting water with the water injectors to injecting water at the deactivated cylinders. Further, graph 600 shows changes in a combustion air-to-fuel ratio (AFR) at plot 606, relative to stoichiometry 606, changes in the ammonia content of a SCR catalyst (e.g., second catalyst) at plot 608, relative to a threshold level 616, changes in the regeneration state of a three-way catalyst, TWC (e.g., first catalyst) at plot 610, relative to a regenerated or threshold state 618, and changes in NOx emission at plot 612. All changes are shown over time (along the x-axis).

Prior to t1, the engine may be operating in the non-VDE mode (plot 602) with all engine cylinders active and combusting substantially at stoichiometry 614 (plot 606). The water injectors may be turned off such that no water is injected at the engine cylinders (plot 604). As the engine operates at stoichiometry, an ammonia content of the SCR catalyst may gradually increase (plot 608). Prior to t1, the ammonia content of the SCR catalyst may be higher than the threshold level 616 and the three-way catalyst (TWC) may be in a higher state of regeneration (above threshold state 618), that is, it may not require further regeneration.

At t1, due to a change in engine operating conditions (e.g., during an extended tip-out), the engine may shift to a VDE mode of operation (plot 602) with one or more engine cylinders (e.g., on a selected bank) being selectively deactivated. The combustion air-to-fuel ratio of the active engine cylinders may be maintained substantially at stoichiometry (plot 606). During cylinder deactivation, water may be injected at the deactivated engine cylinders (or corresponding exhaust manifolds) (plot 604). During cylinder deactivation (between t1 and t2), the TWC may experience some oxidation, thereby decreasing the regeneration state of the TWC (plot 610). Additionally, the ammonia content of the SCR catalyst may decrease slightly. However, these changes may be less than if no water injection was used during the cylinder deactivation.

At t2, in response to cylinder reactivation conditions being met (plot 602), engine operation may be shifted back to non-VDE mode. In addition, to regenerate the TWC, a combustion air-to-fuel ratio (plot 606) may be enriched for a duration d1 to bring the regeneration state of the TWC (plot 610) above the threshold state 618. The degree of richness of the rich fuel injection is adjusted based on the ammonia storage content (plot 608) of the SCR catalyst. Herein, since the ammonia content is below the threshold level 616 upon reactivation of the cylinders, a rich fuel injection of a higher rich bias of a duration d1 is used to regenerate the TWC. However, the duration d1 may be shorter and the amount of rich bias may be lower than if no water injection had been used during the cylinder deactivation. While the TWC is being regenerated, the ammonia stored on the SCR catalyst may be consumed to reduce exhaust NOx species, such that an exhaust NOx level at the time of shift from VDE mode to non-VDE mode is substantially maintained (plot 612). However, as the cylinder continue to combust the richer air-to-fuel ratio, the ammonia content of the SCR catalyst may begin to increase before t3. At t3, the combustion air-to-fuel ratio of the reactivated cylinders may return to stoichiometry 614.

At t4, another change in engine operating conditions may occur causing the engine to shift to a VDE mode of operation (plot 602) with one or more engine cylinders (e.g., on a selected bank) being selectively deactivated. Again, the combustion air-to-fuel ratio of the active cylinders may remain at stoichiometry 614 (plot 606). In response to the cylinder deactivation, water is injected by the water injectors at the deactivated engine cylinders (plot 604). During the cylinder deactivation, between t4 and t5, the ammonia content of the SCR catalyst may remain above the threshold level 616 (plot 608) and the regeneration state of the TWC may remain above or at the threshold state 618 (plot 610). As such, NOx emission level may be maintained (plot 612). At t5, the engine may shift from the VDE mode to a non-VDE mode, thereby reactivating the deactivated cylinders. Since the ammonia content of the SCR catalyst is greater than the threshold level 616 at t5, the combustion air-to-fuel ratio of the reactivated cylinders may have a lower rich bias. In the example, shown in graph 600, the lower rich bias may be small such that the combustion air-to-fuel ratio of the reactivated cylinders is only slightly lower than stoichiometry 614. As shown at from t4 to t5, water injection reduced the oxidation of the TWC and the reduction of ammonia. Thus, less rich bias was required when reactivating the cylinders, thereby reducing the fuel penalty to the engine. If no water injection had been used between t4 and t5, a larger rich bias would have been required at t5 to regenerate the exhaust catalyst.

It will be appreciated that while the example of FIG. 6 is explained with reference to a VDE event as the lean engine event, in an alternate example, the lean event may be an engine idle-stop. Therein, the same trends would be seen during a restart from the engine isle-stop as depicted here during the shift from VDE to non-VDE mode.

In this way, one or more engine cylinders may be selectively deactivated via deactivatable fuel injectors. Then, water may be injected at the one or more deactivated engine cylinders during deactivation. Injecting water may reduce an amount of oxidation of an exhaust catalyst, such as a three-way catalyst (TWC). Upon reactivation of the one or more deactivated engine cylinders, a combustion air-to-fuel ratio may be decreased, or enriched, in order to regenerate the three-way catalyst. However, less regeneration may be required due to the water injection during the deactivation event. The ammonia content of another exhaust catalyst, such as an SCR catalyst, may indicate how much regeneration is required and subsequently the required degree of richness of the combustion air-to-fuel ratio during cylinder reactivation.

As shown at t2 in FIG. 6, during a first cylinder reactivation, when an ammonia content of an exhaust catalyst is lower than a threshold, a controller may adjust an engine combustion air-to-fuel ratio to be richer than stoichiometry with a first, higher rich bias. During a second reactivation of the cylinders, as shown at t5, when the ammonia content of the exhaust catalyst is higher than the threshold, adjusting the engine combustion air-to-fuel ratio to be richer than stoichiometry with a second, lower rich bias. As shown between t2 and t3, during each of the first and second cylinder reactivations, the adjusting the engine combustion air-to-fuel ratio is continued for a duration based on the ammonia content of the exhaust catalyst. In another example, duration d1 may be lower if the ammonia continent of the SCR catalyst is greater than shown at t2 in FIG. 6.

As discussed above, injecting water at the one or more deactivated engine cylinders includes one of injecting water at an intake port, upstream of an intake valve of the one or more deactivated engine cylinders, injecting water directly into the one or more deactivated engine cylinders, or injecting water at an exhaust manifold of the one or more deactivated engine cylinders. An injection timing of water injection may then be determined based on a position of the water injection. Further an amount of water injected during the injecting water may be determined based on one or more of an engine cylinder volume, engine temperature, engine speed, and a manifold pressure and wherein the amount of water injected increases with increasing cylinder volume and decreasing engine temperature.

Returning to FIG. 6, as shown between t1 and t2 and between t4 and t5, during the selectively deactivating one or more engine cylinders, fuel injection of active engine cylinders may be adjusted to maintain a stoichiometric air-to-fuel ratio. In alternate example, fuel injection of the active engine cylinders may be adjusted to maintain an air-to-fuel ratio slightly richer than stoichiometry. Finally, as shown at t2 and t5, water injection may be stopped when the one or more deactivated cylinders are reactivated.

In this way, during an engine cylinder deactivation event, injecting water at the selectively deactivated engine cylinders may reduce the amount of oxygen traveling to the exhaust system and reaching a first exhaust catalyst and a second exhaust catalyst. In one example, in response to cylinder deactivation, one or more water injectors may inject water into an intake port of one or more deactivated engine cylinders. Then, upon reactivation of the engine cylinders, a combustion air-to-fuel ratio of the reactivated cylinders may be adjusted based on the ammonia content of the second exhaust catalyst. Specifically, a combustion air-to-fuel ratio with a lower rich bias may be used to regenerate the first exhaust catalyst if the ammonia content is greater than a threshold level. Alternatively, a combustion air-to-fuel ratio with a higher rich bias may be used to regenerate the first exhaust catalyst if the ammonia content of the second exhaust catalyst is less than the threshold level. Water injection may help to decrease the required amount of exhaust catalyst regeneration. In this way, injecting water during engine cylinder deactivation may reduce fuel penalty of the engine, while also maintaining a required NOx level.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
selectively deactivating one or more engine cylinders via deactivatable fuel injectors;
during cylinder deactivation, injecting water at the one or more deactivated engine cylinders to reduce oxygenation of a first exhaust catalyst; and
injecting water at an exhaust manifold of the one or more deactivated engine cylinders before an exhaust valve of the one or more deactivated engine cylinders opens.

2. The method of claim 1, wherein injecting water at the one or more deactivated engine cylinders includes port injecting water on a closed intake valve of the one or more deactivated engine cylinders before the intake valve opens.

3. The method of claim 1, wherein injecting water at the one or more deactivated engine cylinders includes direct injecting water into the one or more deactivated engine cylinders before an intake valve of the one or more deactivated engine cylinders opens.

4. The method of claim 1, further comprising adjusting an amount of water injected during the injecting water based on one or more of an engine cylinder volume, engine temperature, engine speed, and a manifold pressure.

5. The method of claim 1, further comprising estimating an ammonia content stored in a second exhaust catalyst after engine cylinder reactivation conditions are met.

6. The method of claim 5, further comprising stopping water injection when reactivating the one or more deactivated engine cylinders.

7. The method of claim 6, further comprising adjusting a combustion air-to-fuel ratio of the reactivated engine cylinders based on the ammonia content stored in the second exhaust catalyst.

8. The method of claim 7, wherein the combustion air-to-fuel ratio decreases with decreasing ammonia content.

9. The method of claim 1, wherein selectively deactivating one or more engine cylinders includes deactivating all engine cylinders responsive to an idle-stop condition.

10. The method of claim 1, wherein selectively deactivating one or more engine cylinders includes deactivating one or more engine cylinders responsive to a torque demand below a threshold.

11. The method of claim 1, further comprising deactivating one or more engine cylinders while other engine cylinders continue combusting.

12. An engine method, comprising:
selectively deactivating one or more engine cylinders via deactivatable fuel injectors;
injecting water at the one or more deactivated engine cylinders during deactivation; and then
during a first cylinder reactivation, when an ammonia content of an exhaust catalyst is lower than a threshold, adjusting an engine combustion air-to-fuel ratio to be richer than stoichiometry with a first, higher rich bias; and
during a second cylinder reactivation, when the ammonia content of the exhaust catalyst is higher than the threshold, adjusting the engine combustion air-to-fuel ratio to be richer than stoichiometry with a second, lower rich bias.

13. The method of claim 12, wherein during the first cylinder reactivation and the second cylinder reactivation, the adjusting the engine combustion air-to-fuel ratio is continued for a duration based on the ammonia content of the exhaust catalyst.

14. The method of claim 13, further comprising determining an injection timing of water injection based on a position of the water injection.

15. The method of claim 12, wherein injecting water at the one or more deactivated engine cylinders includes one of injecting water at an intake port, upstream of an intake valve of the one or more deactivated engine cylinders, injecting water directly into the one or more deactivated engine cylinders, or injecting water at an exhaust manifold of the one or more deactivated engine cylinders.

16. The method of claim 12, further comprising determining an amount of water injected during the injecting water based on one or more of an engine cylinder volume, engine temperature, engine speed, and a manifold pressure and wherein the amount of water injected increases with increasing cylinder volume and decreasing engine temperature.

17. The method of claim 12, further comprising, during the selectively deactivating one or more engine cylinders, adjusting fuel injection of active engine cylinders to maintain a stoichiometric air-to-fuel ratio.

18. The method of claim 12, further comprising stopping injecting water when the one or more deactivated cylinders are reactivated.

19. The system of claim 18, further comprising stopping water injection, reactivating the one or more deactivated engine cylinders, and adjusting a combustion air-to-fuel ratio of the reactivated engine cylinders based on an ammonia content stored in the second exhaust catalyst.

20. An engine system, comprising:
an engine including an intake manifold and an engine cylinder, the engine cylinder having an intake port with an intake valve and a deactivatable fuel injector;
a water injection system having a water injector positioned in the intake port, upstream of the intake valve, for injecting water on the intake valve;
an emission control device having a first exhaust catalyst and a second exhaust catalyst; and
a controller with computer readable instructions for selectively deactivating one or more engine cylinders via deactivatable fuel injectors and injecting water at the one or more deactivated engine cylinders during the deactivation to reduce oxidation of the first exhaust catalyst.

* * * * *